United States Patent [19]
Delverdier et al.

[11] Patent Number: 6,085,865
[45] Date of Patent: Jul. 11, 2000

[54] SOUNDPROOFING PANEL AND METHOD OF PRODUCING SAID PANEL

[75] Inventors: Osmin Régis Delverdier, Montastruc la Conseillere; Patrick Gonidec, Montivilliers; Jacques Michel Albert Julliard, Hericy; Bernard Louis Le Barazer, Le Havre; Eric Lecossais, Virville; Georges Jean Xavier Riou, Melun; Philippe Jean Marcel Vie, Toulouse, all of France

[73] Assignees: Societe Nationale d'Etude et de Construction de Moteurs d'Aviation "Snecma", Paris; Ateca, Montauban; Hispano-Suiza Aerostructures, Paris, all of France

[21] Appl. No.: 09/257,191

[22] Filed: Feb. 25, 1999

[30] Foreign Application Priority Data

Feb. 26, 1998 [FR] France .................................. 98 02346

[51] Int. Cl.$^7$ ...................................................... E04B 1/82
[52] U.S. Cl. ........................... 181/292; 181/286; 428/116
[58] Field of Search ..................... 181/210, 205, 181/214, 286, 290, 292; 428/116

[56] References Cited

U.S. PATENT DOCUMENTS 4,667,768   5/1987   Wirt .
5,997,985   12/1999  Clarke et al. ............................ 181/292

FOREIGN PATENT DOCUMENTS 2 561 877   10/1985   France .
2 649 356   1/1991    France .
1 387 692   3/1975    United Kingdom .
2 256 395   12/1992   United Kingdom .

*Primary Examiner*—Khanh Dang
*Attorney, Agent, or Firm*—Oblon, Spivak, McClelland, Maier & Neustadt, P.C.

[57] ABSTRACT

A soundproofing panel comprises a honeycomb core sandwiched between a solid skin and a porous skin, the cells of the honeycomb being divided in the direction of its thickness into at least two resonant cavities by a least one partition which is traversed by passages interlinking the cavities. The partitions are formed by a plurality of hollow microbeads having porous walls, the microbeads being bonded to one another and to the walls of the honeycomb at their points of contact. Such a soundproofing panel combines high performance in terms of linearity as a function of the level of sound excitation, attenuation band, bulk and mechanical strength.

10 Claims, 1 Drawing Sheet

U.S. Patent      Jul. 11, 2000      6,085,865
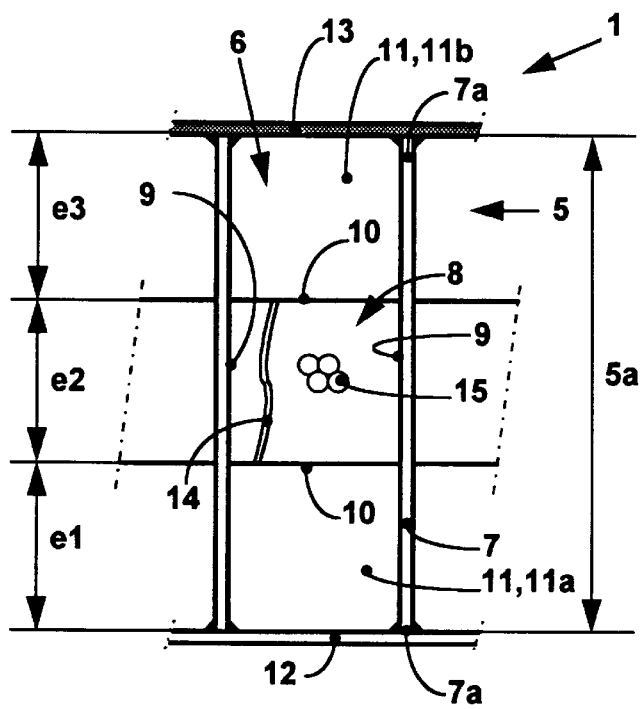
Fig : 1
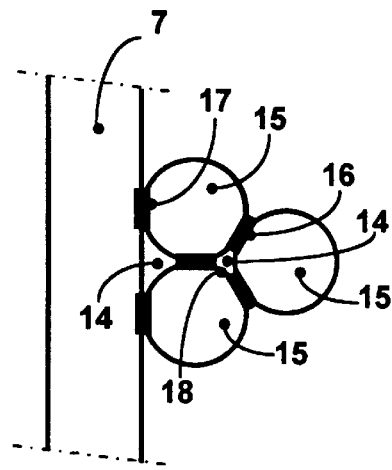
Fig : 2
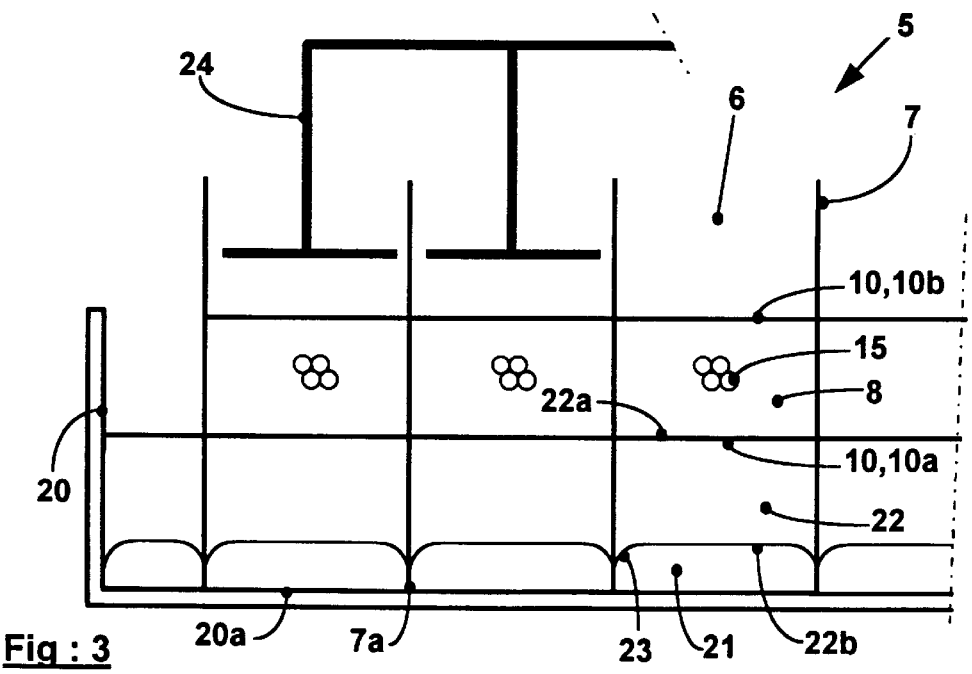
Fig : 3

SOUNDPROOFING PANEL AND METHOD OF PRODUCING SAID PANEL

BACKGROUND OF THE INVENTION

1. Field of the Invention

The invention relates to soundproofing sandwich structures, and more especially to so-called "passive" honeycomb soundproofing panels operating on the basis of quarter-wavelength tuned Helmoltz resonators.

Ever more restrictive standards are forcing ever greater reductions in the sound emission from commercial aircraft, particularly during takeoff and in the vicinity of airports. This sound emission may attain 155 decibels on takeoff, especially against the inside walls of the pods surrounding turbojet engines and their gas flows, and it results in acoustic excitations of an aerodynamic origin stemming essentially from the engines and aeroacoustic excitations which generate considerable vibro-acoustic phenomena both with regard to the structures and the cabin. The sound emission occurs primarily in a fairly wide frequency range stretching from 200 to 8000 Hz, and more particularly between 600 and 5000 Hz where the annoyance is greatest. However, the current trend is toward the general use of so-called high bypass ratio fan-jet engines which allow substantial reductions in the consumption of fuel to be achieved. These turbojet engines have a lower speed of rotation, and consequently their sound emission is extended more toward the low frequencies.

In this context, designers and manufacturers of specific aeronautical components are searching for soundproofing treatments which make is possible to reduce the acoustic levels without penalizing other aspects such as mechanical strength, weight and bulk. In particular, a reduction in bulk can be achieved by soundproofing panels of lesser thickness, thus making it possible to thin down the structures of the aircraft, particularly the pods surrounding the engines, and consequently to reduce the drag of the aircraft and its fuel consumption.

2 Summary of the Prior Art

The known soundproofing panels with the highest performance in terms of acoustic effectiveness, weight and bulk are formed from a sandwich structure comprising a honeycomb core whose cells are arranged as Helmoltz resonators. The behavior of the panel can be represented by its reduced normalized acoustic impedance with respect to the impedance of air $\rho c$:

$$Z = R + j.X$$

The real term R expresses its resistive component and should be close to one for better absorption of sound at middle frequencies. The complex term X expresses its reactive component and should be a minimum so as to avoid absorption-free reflection of the sound at the bottom of the soundproofing panel.

It is known practice to make dual Helmoltz resonator soundproofing panels comprising, in succession, a solid skin, a honeycombed core whose cells are divided in the direction of its thickness into two cavities by a thin partition made of resin and perforated right the way through it, and a porous skin which communicates with the sound source. The partition is positioned so as to tune the resonance according to two chosen frequencies, the air molecules moving alternately from one cavity to the other via the perforations through the partition, and energy dissipation taking place through the viscous laminar flow of the air at the perforations. The perforations are usually formed by laser beam, since they should preferably be of small size and high density. However, it is known that these perforated partitions exhibit a considerable nonlinearity with fast displacement speeds resulting from high acoustic levels. Therefore, a panel which is optimized at low sound levels, for example at 120 decibels, will experience a degraded performance at high sound levels, for example at 155 decibels, and vice versa. Moreover, the optimization of such soundproofing panels leads to a ratio between the total area of the perforations and the surface area of the partition, referred to as the "perforation ratio" or "porosity", of the order of 2% to 5%. Hence, the speed of the air molecules increases greatly on passing through the partition, thereby increasing the nonlinear behavior of the partition.

It is also known practice to make soundproofing panels of the same type in which the partition is formed by a fabric of metal wires sandwiched between two honeycomb layers. This partition offers better linearity combined with greater porosity, i.e. of the order of 20%, such porosity engendering a lesser increase in the speed of the air molecules passing through the partition and therefore improving the linearity. However, such a panel exhibits a proneness to delamination between the two honeycomb layers and the fabric.

It is understood that the dividing of the honeycomb into two layers is effected merely for purposes of feasibility and cost.

It is also known practice to make soundproofing panels consisting of an absorbent filler sandwiched between two skins, one at least of which is porous. The filler may be provided by fiber, by an open-pored foam, or more recently by microbeads, hollow microbeads with porous walls seeming to give the best results. However, such panels should have a thickness approaching substantially a quarter of the wavelength of the sound at the lowest frequency to be absorbed, and in aeronautics this would lead to prohibitive bulk. Moreover, these panels would be very heavy since their effectiveness depends on the density of the absorbent filler.

SUMMARY OF THE INVENTION

It is one object of the invention to provide a soundproofing panel which reconciles demanding imperatives in terms of soundproofing and mechanical strength without compromising its weight and bulk, and which is capable of being manufactured industrially.

A second object is to provide a soundproofing panel exhibiting improved attenuation at low frequencies at constant thickness or, conversely, reduced thickness at constant attenuation at low frequencies.

A third object is to provide a suitable method for producing such soundproofing panels.

With these objects in view, according to a first aspect of the invention there is provided a soundproofing panel comprising a solid skin defining one face of said panel, a porous skin defining the opposite face of said panel, and a honeycomb core sandwiched between and bounded to said solid skin and said porous skin, said honeycomb core comprising walls extending the direction of the thickness of said honeycomb core between the two skins to define cells of said honeycomb core, at least one partition in each of said cells dividing the cell into at least two cavities in the direction of the thickness of said honeycomb core, said partitions having edges which are in contact with and bonded to said walls defining said cells, and means defining passages which extend through said partitions to interconnect said cavities, wherein said partitions are each formed by a plurality of hollow spherical microbeads having porous walls, said microbeads being in mutual contact with eachother and being adhesively bonded together at their points of contact, and the microbeads at said edges of said partitions being adhesively bonded to said walls of said cells at points of contact between said microbeads and said walls, and wherein said partitions have a thickness which is at least equal to 15% of the thickness of said honeycomb core.

Such soundproofing panels combine high performance in terms of acoustic effectiveness or sound attenuation, mechanical strength, weight and bulk, and are particularly suitable for soundproofing turbojet engines and aircraft structures.

It will be understood that the assembly of microbeads constituting the partition in each cell forms a malleable mass until the binder has set, that is to say until it achieves an effective bonding function. Therefore the partitions may be formed wholly or partly inside the cells of the honeycomb, with the result that it is possible for the honeycomb to be made as a single layer. When the microbeads are bonded together, sturdy partitions are obtained which adhere at their edges to the walls of the honeycomb, and which thus retain their shape and their position in the cells of the honeycomb. Also, it will be understood that because the microbeads are bonded together at their points of contact, spaces constituting a multitude of passages which link the cavities together will remain between the microbeads, and the porosity of the microbeads will supplement the interconnection formed by these passages.

One advantage of the invention is that the partitions allow strong dissipation of the sound energy by viscous laminar flow of the air, making it possible to adjust the resistive term R to its optimal value in a simple manner. This can be understood from the fact that the use of microbeads which are substantially spherical provides the passages with considerable surface area in relation to the mean cross section of these ducts, said surface area producing a considerable viscous laminar flow of the air. This phenomenon is increased by the fact that the air molecules follow a winding route through the partition, thus increasing the mean distance travelled, while the thickness of the partition may be increased at will. The phenomenon is further increased by the fact that the lateral surfaces of the passages, which are formed by convex portions of geometrical spheres, engender considerable scattering of the acoustic waves inside the network of passages between the microbeads.

Another advantage is that the permeability of the partitions remains good, thus making it possible to reduce the reactive term X. This good permeability can be explained essentially by the high porosity of the partitions, typically from 20% to 43%. This being noted, it will be understood that the thickness of the partitions can be increased to a value which is at least equal to 15% of the thickness of the honeycomb, the effect of which is to increase the mean distance travelled by the air between the two cavities, while nevertheless retaining good permeability and effectiveness of the partitions. The result is an improvement in the attenuation of sound at low frequencies by lowering the resonant modes. The optimum lies between 30% and 35%, and the performance of the soundproofing panel deteriorates beyond this.

Another advantage is that the linearity with the sound level of the soundproofing panel is good, the properties of the panel remaining substantially constant. This can be explained, but only in part, by the good permeability of the partitions, which allows a lesser increase in the speed of the air molecules passing through the wall. For the rest, it must be supposed that by employing microbeads it is possible to obtain passages with superior aerodynamic properties, that is to say which allow the air to flow well, the porosity of the microbeads probably also contributing to this. Measurements have shown that for flow speeds of the air molecules ranging from 0.2 to 2 m/s (meters per second), the resistive term of a partition formed in accordance with the invention is multiplied by a coefficient ranging from 1.1 to 1.3 only. By comparison, the resistive term of a perforated partition is multiplied by about 10.

A further advantage is that soundproofing panels according to the invention exhibit, for the same thickness, improved effectiveness at low frequencies. This may be explained by the fact that the path of the air between the two resonant cavities is lengthened by the possibility of producing thick partitions and by the winding route of the air inside said partitions, thus making it possible to enhance the reactive effect of the cavity and to shift the tuning toward the low frequencies.

Preferably, the mass of microbeads forming each partition comprises a mixture of batches of microbeads of homogeneous diameters, that is to say that the microbeads within a batch have substantially equal diameters to within manufacturing tolerances, and the thickness of the partition is at least equal to ten times the mean diameter of the microbeads of the batch with the smallest diameters. This has the effect of increasing the lateral surface areas of the passages, but without substantially penalizing the permeability of the partition, and the result of this is to improve the dissipation by viscous laminar flow of the air in the partitions and consequently the attenuation afforded by the soundproofing panel.

In a preferred embodiment, the microbeads constituting a partition have diameters ranging from 0.2 to 1 mm, the optimum corresponding to a range of from 0.3 to 0.5 mm, and the thickness of the partition is at least equal to ten times the mean diameter of the microbeads.

Typically, a conventional soundproofing panel having two resonant cavities exhibits an attenuation coefficient substantially equal to 0.72 at 1000 Hz and 0.41 at 500 Hz for a thickness of 40 mm, while a soundproofing panel of the same thickness constructed in accordance with the invention exhibits an attenuation coefficient substantially equal to 0.85 at 1000 Hz and 0.72 at 500 Hz, the partitions in this case having a thickness of 13 mm of microbeads. Conversely, the invention makes it possible to reduce the thickness of the soundproofing panels for a specified attenuation at low frequenices. As a reminder, a theoretical attenuation coefficient equal to 1 corresponds to the total absorption of the sound energy.

A further advantage is that soundproofing panels in accordance with the invention exhibit an improved attenuation band as compared with conventional panels having two resonant cavities. The conventional panel of the above example exhibits an attenuation band stretching substantially from 1200 Hz to 5300 Hz, i.e. 2.1 octaves, for an attenuation coefficient of 0.8. For this same attenuation coefficient, the panel of the above example in accordance with the invention exhibits an attenuation band stretching from 500 Hz to 3500 Hz, i.e. 2.6 octaves.

According to a further aspect of the invention there is provided a method of producing a soundproofing panel in accordance with the invention, the method comprising the following steps:

providing a honeycomb core comprising walls extending in the direction of the thickness of said honeycomb core to define cells of said honeycomb;

providing a plurality of hollow spherical microbeads having porous walls;

coating said microbeads with a binder having a dynamic viscosity of from 0.5 to 3 Pa.s;

introducing a predetermined volume of the coated microbeads into each cell of said honeycomb core;

positioning said coated microbeads in each cell to form a partition dividing the cell into two cavities in the direction of the thickness of said honeycomb core, wherein said coated microbeads forming said partition are in mutual contact with eachother, and the coated microbeads at the edges of said partition are in contact with said walls of the cell, and wherein the thickness of said partition is at least equal to 15% of the thickness of said honeycomb core;

causing the binder coating said microbeads to set to bond the partition in each cell in position;

applying and bonding a solid skin to one face of said honeycomb core; and applying and bonding a porous skin to the other face of said honeycomb core.

The binder, which should have a dynamic viscosity ranging from 0.5 to 3 Pa.s (Pascals.seconds) at 25° C., is preferably metered out at a dose of from 0.1 to 1 g/cm$^3$. A very fluid binder of this type locates to the points of contact between adjacent microbeads and between the microbeads and the walls of the honeycomb, while preserving the natural porosity of the walls of the microbeads. Preferably the metered dose of binder is not more than 0.3 g/cm$^3$ in order to ensure good clearance of the spaces left between the microbeads If the soundproofing panel to be produced is curved, microbeads made of an elastomeric material or any other material exhibiting a limited but sufficient capacity for deformation will preferably be used. The partitions will be formed in the cells of the honeycomb while the honeycomb is flat, and the honeycomb will then be arched to the required curved shape after setting of the binder and prior to the application and bonding of the skins to the honeycomb. It will be understood that making the microbeads deformable allows the honeycomb to be cambered without degrading the partitions, since the partitions can follow the slight dimensional variations in the cells which result from the cambering.

In an alternative method of producing a curved soundproofing panel in accordance with the invention, the binder used is an elastomer or any other material exhibiting a limited but sufficient capacity for deformation, and the honeycomb will be arched to the required curved shape after setting of the binder and prior to the application and bonding of the skins to the honeycomb. It will be understood that the effect of this is to render deformable the bonds formed between microbeads and between the microbeads and the walls of the honeycomb, which will allow the honeycomb to be cambered without degrading the partitions due to the fact that the partitions can follow the slight dimensional variations in the cells which result from the cambering.

The introduction of the microbeads into the cells of the honeycomb and the forming of the partitions may comprise the following operations:

providing a waxy support exhibiting a planar forming surface;

pressing the honeycomb into said waxy support on the same side as the forming surface until said forming surface reaches the required position for one face of the partitions within the cells of the honeycomb;

introducing a volume of microbeads coated with the binder in the fluid state into each cell, this volume being equal to the volume of the partition to be formed in the cell; and packing the binder-coated microbeads against the forming surface in each cell; the waxy support being removed after the binder has been caused to set at least partially and prior to the application and bonding of the skins to the honeycomb. The waxy support may be a material such as paraffin wax or a wax which is solid at ambient temperature but has a low melting point, for example lying between 50° C. and 90° C.

In a preferred embodiment, the introduction of the microbeads into the cells of the honeycomb and the forming of the partitions comprise the following operations:

providing a waxy support exhibiting a planar forming surface;

covering the forming surface with a layer of microbeads coated with the binder in the fluid state, the thickness of said layer of microbeads being substantially equal to that of the partitions to be obtained (it being possible for this thickness to be slightly reduced so as to take account of the thickness of the walls of the honeycomb); and pressing the honeycomb into the layer of microbeads and the waxy support until the layer of microbeads reaches the required position of the partitions inside the cells of the honeycomb;

the waxy support being removed after the binder has been caused to set at least partially and prior to the application and bonding of the skins to the honeycomb. As mentioned earlier, the waxy support may be a material such as paraffin wax or a wax which is solid at ambient temperature but has a low melting point, for example between 50° C. and 90° C.

Preferably, the waxy support is disposed with its surface opposite the forming surface on a bed of water, and the honeycomb is pressed completely through the waxy support until the latter is recessed by at least 2 mm inside the honeycomb. The effect of this is to form a concave meniscus along the junctions between the walls of the honeycomb and the surface of the waxy layer opposite the forming surface, which accelerates the expulsion of the waxy layer when it is melted so that the material does not penetrate into the partitions by capillarity.

BRIEF DESCRIPTION OF THE DRAWINGS

FIG. 1 is a diagrammatic sectional view through the thickness of a portion of one embodiment of a soundproofing panel in accordance with the invention, illustrating the structure of the panel;

FIG. 2 is an enlarged sectional view of a portion of FIG. 1 showing the structure of the partitions of the panel; and;

FIG. 3 is a diagrammatic view illustrating one embodiment of a process for producing soundproofing panels in accordance with the invention.

DESCRIPTION OF THE PREFERRED EMBODIMENTS

FIG. 1 shows a soundproofing panel 1 having a laminated structure comprising a honeycomb core 5 consisting of cells 6 separated by walls 7 oriented in the direction of the thickness 5a of the honeycomb 5 and running without interruption through the whole thickness of said honeycomb 5. The cells 6 are open at each face of the honeycomb 5. They customarily have a hexagonal cross section, but cells having a rectangular or triangular cross section may also be used. Each of the cells 6 is divided in the direction of the thickness 5a by a transverse partition 8 whose edges 9 are adhesively bonded to the walls 7. The partitions 8 are oriented perpendicularly to the direction of the thickness 5a, and are bonded on either side by substantially plane faces 10 perpendicular to the direction of the thickness of the thickness 5a. The partitions 8 divide each cell 6 into two cavities 11, each open on the outside of the honeycomb 6. The honeycomb 5 is sandwiched between the solid skin 12 and a porous skin 13, the walls 7 of the honeycomb being bonded at their ends 7a to the skins 12, 13 to constitute the structure of the soundproofing panel 1 and ensure its rigidity and mechanical strength. The inner cavity, that is to say the cavity which is adjacent the solid skin 12, will be referenced 11a, and outer cavity, i.e. the cavity which is adjacent the porous skin 13, will be referenced 11b. Each partition 8 is traversed right through by a plurality of passages 14 which place the cavities 11a, 11b into communication with eachother, and the outer cavity 11b is in communication with outside the panel 1 through the porous skin 13. Thus, acoustic energy outside the soundproofing panel 1 will pass through the porous skin 13 and cause the cavities 11 coupled together by the passages 14 through the partitions 8 to resonate. The energy is dissipated mainly by viscous laminar flow of the air passing through the partitions 8, and to a lesser extent through the porous skin 13.

As shown in FIG. 2, each partition is constructed of hollow spherical microbeads 15 adhesively bonded together at their points of contact 16, with the microbeads adjacent the walls 7 being adhesively bonded to these walls 7 at their points of contact 17 with said walls 7. The spaces between the microbeads 15 constitute a network of passages 14 between the faces referenced 10 in FIG. 1. These passages 14 are delimited by the surfaces 18 of the microbeads 15 which constitute the lateral surfaces thereof. These lateral surfaces 18 therefore have the shape of portions of convex and tangential geometrical spheres, so that they possess a considerable surface area compared with the cross section of said passages. Since the microbeads are hollow and have porous walls, some of the air streaming through the passages 14 also passes through the microbeads 15.

In the embodiment illustrated in FIGS. 1 and 2 the inner cavity 11a has a thickness $e_1=11$ mm, the partition 8 has a thickness $e_2=10$ mm and the outer cavity 11b has a thickness $e_3=10$ mm, giving a total thickness of the honeycomb equal to 31 mm. The porous skin 13 and the partition 8 have a porosity of 22%. The partition 8 may be constructed of graded microbeads 15 whose diameters extend from 0.2 to 1 mm. The best results were obtained with graded microbeads whose diameters extend from 0.3 to 0.5 mm. Not quite such good results were obtained with collections of beads of different diameters, namely: 40% of diameter 3 mm+30% of diameter 2 mm+30% of diameter 0.4 mm;

and 50% of diameter 4 mm+30% of diameter 2 mm+20% of diameter 0.8 mm;

the beads of diameter greater than 1 mm being toleranced to plus or minus 0.05 mm, and the beads of diameter less than 1 mm being toleranced by grading to plus or minus 0.1 mm. The microbeads 15 may be made of polyamide, ceramic, metal alloy such as a titanium alloy, or of an elastomer.

The binder is an epoxy resin or an elastomer metered out in a dose of from 0.1 to 1 g/cm$^3$ (grams per cubic centimeter). Above this, the beads will be more or less completely coated in the binder, which will have the effect of reducing the cross section of the passages as well as the porosity of the microbeads. Preferably, the resin is metered out in a dose of not more than 0.3 g/cm$^3$ so as to maximise the lateral surface area of the passages 14 and promote thermal dissipation by viscous laminar flow of the air, especially in the vicinity of the points of contact 16 between the microbeads 15.

FIG. 3 illustrates a method of forming the partitions 8 in the honeycomb 5. The method makes use of a receptacle 20 having a flat and horizontal bottom 20a and containing a layer of water 21 and a thin layer of a waxy substance in the liquid state. The layer of waxy substance may be of wax, paraffin or any other suitable material which has a low melting temperature, i.e. between 50° C. and 85° C., but which retains its consistency at ambient temperature. The layer of waxy substance constitutes, when solidified, a waxy support 22 exhibiting a forming surface 22a remote from the bed of water 21, that is to say opposite from the forming surface 22a.

With the waxy support 22 being cooled but still soft, and the honeycomb 5 preferably heated to between 30° C. and 50° C., the honeycomb is placed on the forming surface 22a of the waxy support 22 and pressed into the support 22 until the honeycomb touches the bottom 20a of the receptacle 20, or until it touches stops disposed on said bottom 20a. The total depth of the water+waxy substance is calculated so that the forming surface 22a reaches the required position of one of the faces 10 of the partition 8 to be formed, having taken into account the thickness of the walls 7 of the honeycomb 5.

A charge of microbeads 15 coated with binder in the fluid state and equal to the volume of the partition 8 to be formed is then introduced into each cell, and the microbeads 15 are packed against the forming surface 22a so as to level the face 10b of the partition 8 remote from said forming surface 22a. The assembly consisting of honeycomb 5+waxy support 22+microbeads 15 is then withdrawn from the receptacle 20 and heated progressively in such a way as to cause simultaneously the removal of the waxy support 22 and the progressive setting of the binder.

The application and bonding of the solid skin 12 and the porous skin 13 to the partitioned honeycomb 5 may then be carried out in accordance with customary techniques compatible with the temperature resistance of the microbeads 15 and the binder.

The bed of water 21 serves two functions:

firstly, it isolates the waxy layer 22 from the bottom 20a of the receptacle 20, thus preventing the waxy support from adhering to the bottom 20a and enabling the assembly of honeycomb+waxy layer to be withdrawn easily from the receptacle 20, and secondly, it allows the formation of a concave meniscus 23 at the junction between the surface 22b in contact with the bed of water 21 and the walls 7, this concave meniscus 23 promoting the expulsion of the waxy support 22 when the waxy substance of which it consists begins to melt and before the waxy substance penetrates into the partition 8 by capillarity. In order for the concave meniscus 23 to form, the waxy layer must be recessed at least 2 mm into the honeycomb from the edges 7a of the walls 7. In other words, the bed of water 21 must penetrate at least 2 mm into the cells 6, and preferably at least 4 mm, but without weakening the waxy layer 22.

The packing of the microbeads against the forming surface 22a may be carried out with the aid of pistons 24 inserted into the cells 6. It is possible for the clearance between the pistons 24 and the walls 7 to be considerable, but it should nevertheless remain less than the radius of the smallest of the microbeads.

In a faster, and hence preferred, embodiment the pre-coated microbeads are spread directly over the forming surface 22a, and the honeycomb 5 is pressed into the assembly consisting of the layer of microbeads and the waxy support 22. Because the walls 7 of the honeycomb cause the microbeads 15 to be displaced as the walls penetrate the layer of microbeads, a slight repacking of the microbeads against the forming surface 22a may be useful in order to level the face 10b of the partition 8 remote from the forming surface 22a.

We claim:

1. A soundproofing panel comprising a solid skin defining one face of said panel, a porous skin defining the opposite face of said panel, and a honeycomb core sandwiched between and bonded to said solid skin and said porous skin, said honeycomb core comprising walls extending in the direction of the thickness of said honeycomb core between the two skins to define cells of said honeycomb core, at least one partition in each of said cells dividing the cell into at least two cavities in the direction of the thickness of said honeycomb core, said partitions having edges which are in contact with and bonded to said walls defining said cells, and means defining passages which extend through said partitions to interconnect said cavities, wherein said partitions are each formed by a plurality of hollow spherical microbeads having porous walls, said microbeads being in mutual contact with each other and being adhesively bonded together at their points of contact, and the microbeads at said edges of said partitions being adhesively bonded to said walls of said cells at points of contact between said microbeads and said walls, and wherein said partitions have a thickness which is at least equal to 15% of the thickness of said honeycomb core.

2. The soundproofing panel as claimed in claim 1, wherein said partitions are each formed by a mixture of batches of microbeads of homogenous diameters, and the partition has a thickness which is at least equal to ten times the means diameter of the microbeads of the batch with the smallest diameters.

3. The soundproofing panel as claimed in claim 1, wherein said microbeads constituting each partition have diameters ranging from 0.2 to 1 mm, and the partition has a thickness at least equal to ten times the mean diameter of the microbeads.

4. A method of producing a soundproofing panel as defined in claim 1, said method comprising the following steps:
providing a honeycomb core comprising walls extending in the direction of the thickness of said honeycomb core to define cells of said honeycomb;
providing a plurality of hollow spherical microbeads having porous walls;
coating said microbeads with a binder having a dynamic viscosity of from 0.5 to 3 Pa.s;
introducing a predetermined volume of the coated microbeads into each cell of said honeycomb core;
positioning said coated microbeads in each cell to form a partition dividing the cell into two cavities in the direction of the thickness of said honeycomb core, wherein said coated microbeads forming said partition are in mutual contact with eachother, and the coated microbeads at the edges of said partition are in contact with said walls of the cell, and wherein the thickness of said partition is at least equal to 15% of the thickness of said honeycomb core;
causing the binder coating said microbeads to set to bond the partition in each cell in position;
applying and bonding a solid skin to one face of said honeycomb core; and
applying and bonding a porous skin to the other face of said honeycomb core.

5. The method as claimed in claim 4, wherein the soundproofing panel to be produced is curved, and wherein:
the microbeads are made of an elastomeric material;
the partitions are formed in the cells of said honeycomb core while said honeycomb core is flat; and,
the method includes the step of arching said honeycomb core to the required curved shape after the step of causing the binder to set and prior to the steps of applying and bonding the skins to said honeycomb core.

6. The method as claimed in claim 4, wherein the soundproofing panel to be produced is curved, and wherein:
the binder is an elastomer; and
the method includes the step of arching said honeycomb core to the required curved shape after the step of causing the binder to set and prior to the steps of applying and bonding the skins to said honeycomb core.

7. The method as claimed in claim 4, wherein the steps of introducing the coated microbeads into the cells of said honeycomb core and positioning said coated microbeads to form the partitions in the cells comprise the following operations:
providing a waxy support exhibiting a planar forming surface;
covering said forming surface with a layer of microbeads coated with said binder in the fluid state, the thickness of said layer of microbeads being substantially equal to the thickness of the partitions to be obtained; and
pressing the honeycomb core into said layer of microbeads and said waxy support until the layer of microbeads reached the required position of the partitions within the cells; and wherein the waxy support is removed after the binder has been caused to set at least partially and prior to the steps of applying and bonding the skins to said honeycomb core.

8. The method as claimed in claim 4, wherein the steps of introducing the coated microbeads into the cells of the honeycomb core and positioning the coated microbeads to form the partitions in said cells comprise the following operations:
providing a waxy support exhibiting a planar forming surface;
pressing the honeycomb core into said waxy support on the same side as the forming surface until the forming surface reaches the required position for one face of the partitions within the cells;
introducing a volume of said microbeads coated with said binder in the fluid state into each cell, said volume being equal to the volume of the partition to be formed in the cell; and
packing the binder-coated microbeads against the forming surface in each cell; and wherein the waxy support is removed after the binder has been caused to set at least partially and prior to the steps of applying and bonding the skins to the honeycomb core.

9. The method as claimed in claim 7, wherein said waxy support comprises a surface opposite said forming surface thereof, and said waxy support is disposed with said opposite surface on a bed of water, and wherein the honeycomb core is pressed completely through said waxy support such that the waxy support is recessed by at least 2 mm inside the honeycomb core and a concave meniscus is formed along the junctions between the walls and the surface of the waxy layer opposite the forming surface.

10. The method as claimed in claim 8, wherein said waxy support comprises a surface opposite said forming surface thereof, and said waxy support is disposed with said opposite surface on a bed of water, and wherein the honeycomb core is pressed completely through said waxy support such that the waxy support is recessed by at least 2 mm inside the honeycomb core and a concave meniscus is formed along the junctions between the walls and the surface of the waxy layer opposite the forming surface.

* * * * *